United States Patent [19]
Budy et al.

[11] Patent Number: 4,862,584
[45] Date of Patent: Sep. 5, 1989

[54] DISK DRIVE ASSEMBLY STATION

[75] Inventors: Gordon D. Budy, Simi Vallley; Kenneth R. Mc Neil, Thousand Oaks, both of Calif.

[73] Assignee: Rigidyne Corporation, Simi Valley, Calif.

[21] Appl. No.: 226,897

[22] Filed: Aug. 1, 1988

[51] Int. Cl.⁴ .............................................. B23P 19/04
[52] U.S. Cl. ...................................... 29/704; 29/737; 369/36; 369/38
[58] Field of Search ................. 29/701, 704, 729, 737, 29/739, 430; 360/97, 99; 369/36, 37, 38, 39

[56] References Cited

U.S. PATENT DOCUMENTS

| | | | |
|---|---|---|---|
| 4,271,489 | 6/1981 | Siryi et al. | 369/38 |
| 4,286,790 | 9/1981 | Siryi et al. | 369/36 |
| 4,502,133 | 2/1985 | Siryi et al. | 369/38 X |
| 4,589,101 | 5/1986 | Schatteman et al. | 369/36 X |
| 4,633,452 | 12/1986 | Shimbo et al. | 369/39 |
| 4,685,095 | 8/1987 | Rudy et al. | 369/36 |

Primary Examiner—Mark Rosenbaum
Assistant Examiner—Peter Dunglea Vo
Attorney, Agent, or Firm—Kelly Bauersfeld & Lowry

[57] ABSTRACT

An assembly station is provided for use in the assembly of disk drive units of the type used in microcomputers, such as personal computers and the like. The assembly station comprises a main platform having a head fixture and a disk fixture for respectively receiving and supporting a head actuator subassembly and a disk subassembly of a disk drive unit. The disk fixture supports the disk subassembly for sliding displacement into precision registry with the actuator subassembly to accommodate facilitated mounting of a housing base onto the actuator and disk subassemblies. In the preferred form of the invention, the assembly station is further adapted to receive and support additional disk drive components for mounting within the housing base. The platform is adapted for inversion to expose these additional disk drive components through platform openings for relatively simple attachment to the housing base at predetermined positions. Moreover, the head and disk fixtures are adapted to support the partially assembled disk drive unit in a manner permitting operational component testing prior to removal from the assembly station.

44 Claims, 12 Drawing Sheets

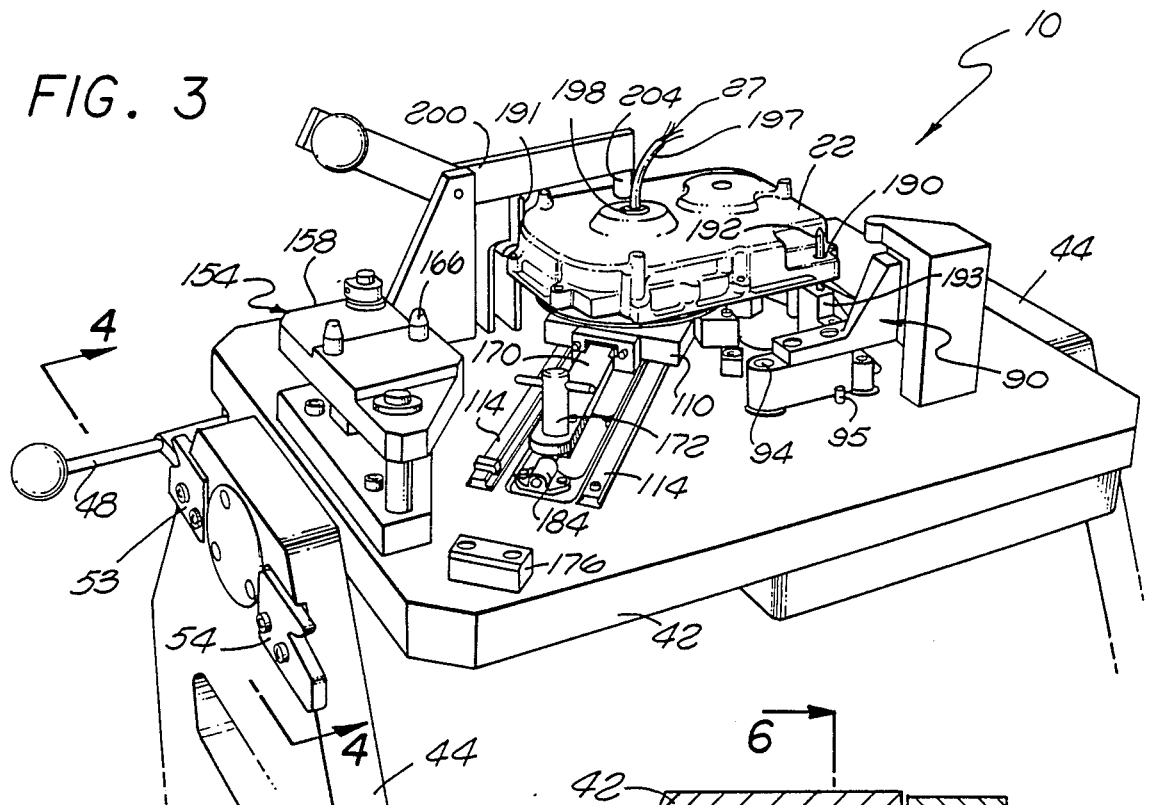
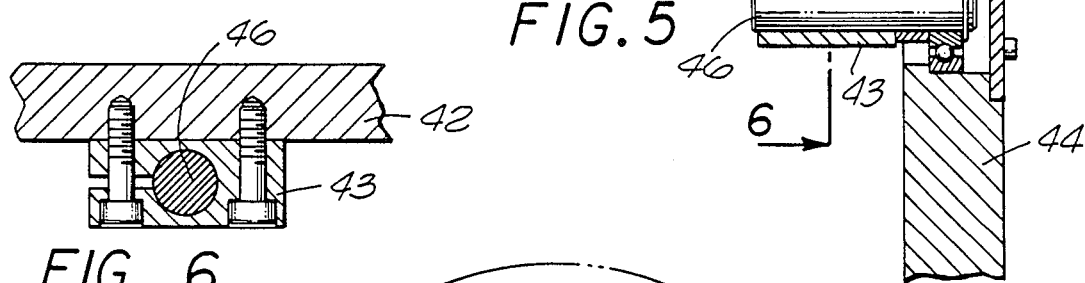
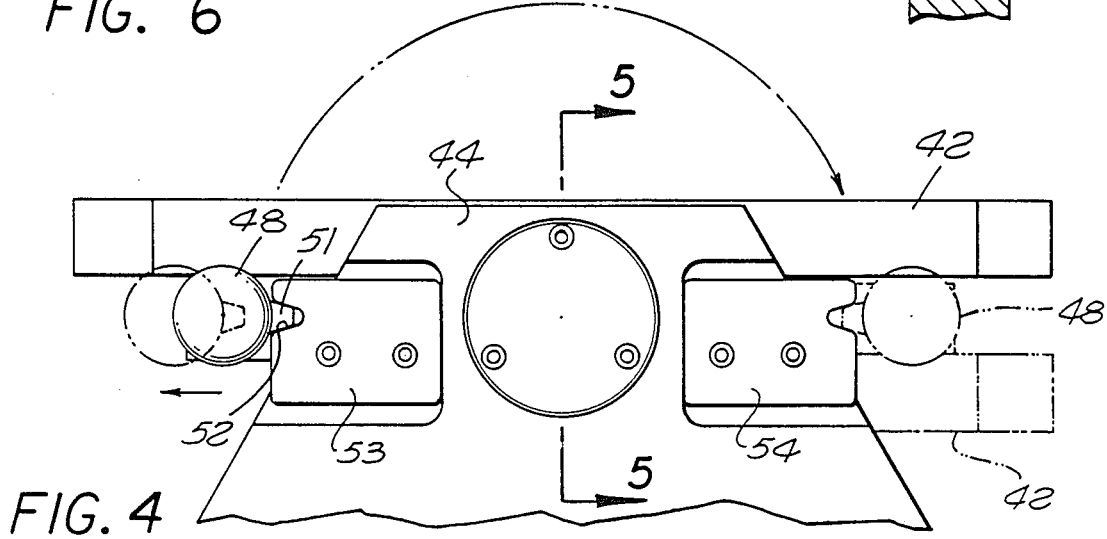

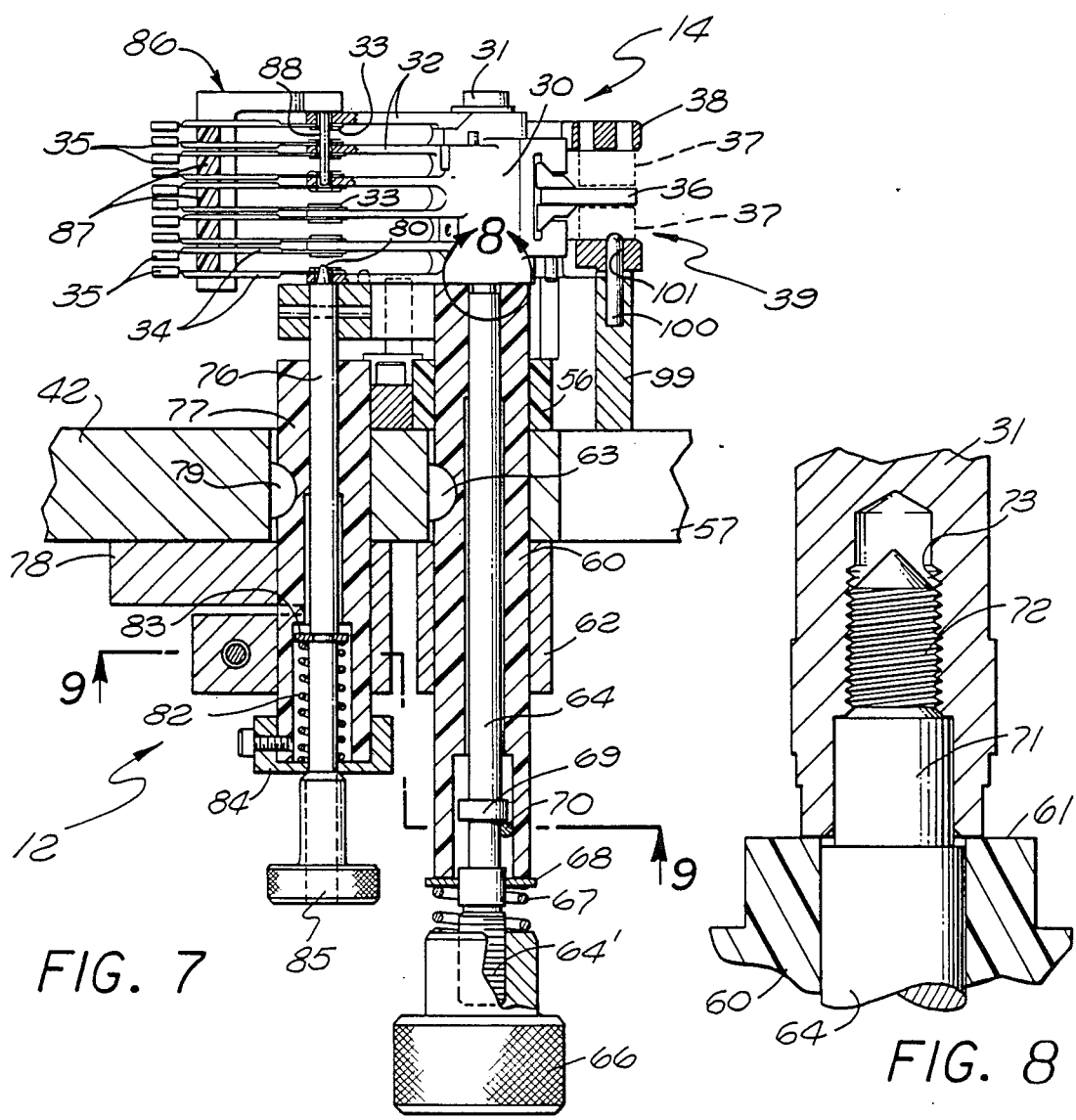
FIG. 7
FIG. 8
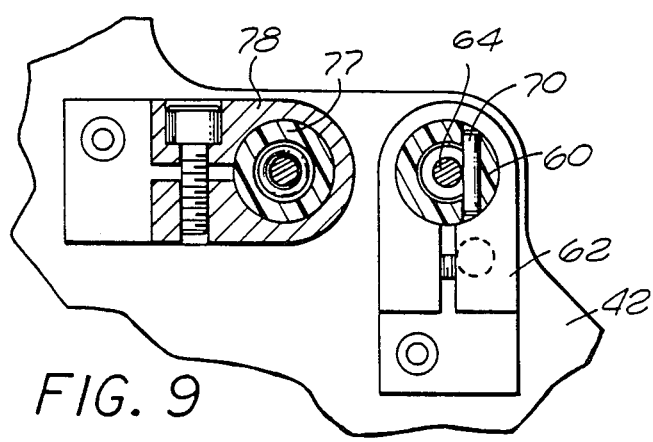
FIG. 9
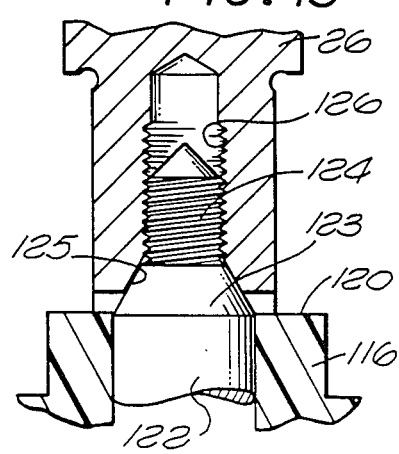
FIG. 15

DISK DRIVE ASSEMBLY STATION

BACKGROUND OF THE INVENTION

This invention relates generally to apparatus and methods for facilitated assembly of disk drive units of the general type used in microcomputers, such as personal computers and the like. More particularly, this invention relates to an assembly station adapted for relatively rapid precision assembly of disk drive units.

In recent years, microcomputer equipment particularly such as personal and desktop computers have become extremely popular for a wide variety of business and educational and other uses. Such computers commonly include a main central processor unit having one or more memory storage disks for storage of data. In one popular form, the storage disk or disks are provided as part of a Winchester-type disk drive unit having multiple storage disks supported in a stack on a rotary spindle within a substantially sealed disk drive housing. The stacked disks are rotatably driven in unison by a small spindle motor, and one or more electromagnetic heads are displaced by a head actuator assembly to traverse disk surfaces for purposes of reading and writing data. Such Winchester-type disk drive units, sometimes referred to as "hard" disks, are generally preferred in comparison to so-called floppy disk drives due to their higher memory storage capacities and faster operating speeds.

The expanding popularity of personal and desktop computers has been accompanied by a demand for Winchester-type disk drive units having increased memory storage capacities with rapid read/write performance characteristics. Moreover, a significant market demand has arisen for smaller disk drive units possessing increased memory storage capacities. As a result, modern disk drive units have become increasingly complex and commonly include multiple storage disks in combination with multiple read/write heads which are mounted within a highly compact disk drive housing. To achieve the desired performance characteristics, such disk drive units have unfortunately required extreme precision during assembly stages during which individual disk drive components or subassemblies are typically installed one at a time into an open housing member or base. In the past, such precision component assembly has been obtained through the use of substantial manual labor in a manner requiring a high degree of skill and care, thereby inherently limiting production efficiency. Moreover, manual assembly of disk drive components can be a particularly difficult and tedious process, such as the assembly of a multiple disk stack into precision registry with multiple read/write heads of a head actuator assembly.

There exists, therefore, a significant need for improved devices and methods for assembling computer disk drive units and the like, particularly with respect to precision assembly of stacked memory storage disks into registration with a plurality of read/write heads. The present invention fulfills these needs and provides further related advantages.

SUMMARY OF THE INVENTION

In accordance with the invention, a disk drive assembly station and related assembly methods are provided for quickly and easily assembling components of a disk drive unit in a precision manner. The assembly station includes, in general terms, a main platform having separate head and disk fixtures in a predetermined, precision spaced relation for respectively receiving and supporting a head actuator subassembly and a disk subassembly of a computer disk drive unit. The head and disk fixtures support the subassemblies for movement into precision registration with each other, and for simplified mounting of the subassemblies into a housing base forming a portion of a sealed housing for the disk drive unit.

In the preferred form of the invention, the head and disk fixtures define reference surfaces for respectively receiving and supporting the actuator subassembly and the disk subassembly on the main platform. Torque spindles are provided with both fixtures for secure fastening to the head actuator and disk subassemblies, respectively, in a manner drawing the subassemblies into firmly seated relation with the reference surfaces. A transfer tool is conveniently provided for facilitating manual or automated handling of the disk subassembly for precision placement onto the disk fixture, wherein the disk subassembly typically comprises a plurality of memory storage disks arranged in a stack. The transfer tool is designed to prevent disk damage or contamination by guarding against disk surface contact with foreign objects.

The disk fixture is supported on the platform by a bearing unit which accommodates disk fixture displacement in a direction toward or away from the head fixture. A preferred bearing assembly comprises linear bearings which support the disk fixture for substantially straight-line displacement toward and away from the head fixture. A push bar carried by the disk fixture is operable to translate the disk fixture along the platform between a first position spaced substantially from the head fixture, and a second position for supporting a disk subassembly in precision registration with a plurality of read/write heads of the actuator subassembly supported on the head fixture. Stop members located respectively on the disk fixture and the main platform are engageable to define a precise stopping point when the disk fixture is displaced to the second position.

The actuator subassembly is mounted onto the head fixture together with a shipping comb for maintaining the plurality of read/write heads in spaced relation to each other. A loading comb is carried by a comb support arm mounted pivotally on the platform for swinging movement into registration with the actuator subassembly. The loading comb includes tapered comb teeth for maintaining the read/write heads in spaced relation while separating a shipping comb from the actuator subassembly to permit shipping comb removal. The loading comb maintains the read/write heads in spaced relation as the disk fixture is translated along the platform to move the disk subassembly into registration with the actuator subassembly. When such registration is achieved, the loading comb is retracted from the subassemblies such that the tapered comb teeth gradually release the read/write heads to land gently within outer landing zones on the surfaces of the memory storage disks.

A housing base is installed quickly and easily over the actuator and disk subassemblies and appropriately fixed thereto by suitable fasteners. Housing pins upstanding from the platform are provided for reception through preformed ports in the housing base to pre-align the housing base with the underlying subassemblies. The housing pins guide the housing base through a sliding downward movement into precision engagement with the subassemblies for simple connection thereto. One or more of these housing pins may be carried on the platform by a pivoting swing arm for movement to an out-of-the-way position until housing base installation is desired.

Prior to housing base installation, additional components of the disk drive unit are advantageously installed onto the platform at predetermined locations. The components may include, for example, a solenoid unit and a magnet unit for operative interaction with the actuator subassembly during normal operation of the disk drive unit. Subsequent to housing base installation, the entire platform is inverted to expose selected interior regions of the now-underlying housing base through platform openings. Appropriate fasteners are insertable through these platform openings for securely fixing the disk drive components to the housing base.

With the platform in an inverted orientation, the actuator and disk subassemblies may be coupled to test means for rotatably driving the memory storage disks in operative relation with the actuator subassembly. In the preferred form, such rotatable driving of the disks causes the read/write heads to fly in slight spaced relation with respect to the outer landing zones on the associated disk surfaces. During this mode, the actuator subassembly is manually displaced to shift the read/write heads into alignment with and conventional parking at inner landing zones on the associated disk surfaces. The solenoid unit may be adjusted as required to lock or park the heads at the inner landing zones. The platform is then returned to the original upright orientation, whereupon the torque spindles are released from the associated actuator and disk subassemblies to permit removal of the partially assembled disk drive unit from the assembly station. Such removal is achieved quickly and easily by lifting the housing base upwardly in guided relation with the housing pins to insure straight lift-off of the subassemblies from the platform. Importantly, the partially assembled disk drive unit includes the actuator and disk subassemblies mounted in precision registration within the housing base.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a fragmented perspective view illustrating installation of a housing base onto the actuator and disk subassemblies supported on the assembly station;

FIG. 4 is an enlarged fragmented end elevation view taken generally on the line 4—4 of FIG. 3;

FIG. 5 is a fragmented vertical sectional view taken generally on the line 5—5 of FIG. 4;

FIG. 6 is a fragmented vertical sectional view taken generally on the line 6—6 of FIG. 5;

FIG. 7 is an enlarged fragmented vertical sectional view taken generally on the line 7—7 of FIG. 2;

FIG. 8 is an enlarged fragmented vertical sectional view corresponding generally with the encircled region 8 of FIG. 7;

FIG. 9 is an enlarged fragmented horizontal sectional view taken generally on the line 9—9 of FIG. 7;

FIG. 15 is an enlarged fragmented vertical sectional view corresponding generally with the encircled region 15 of FIG. 14;

DETAILED DESCRIPTION OF THE PREFERRED EMBODIMENT

Figure 1:
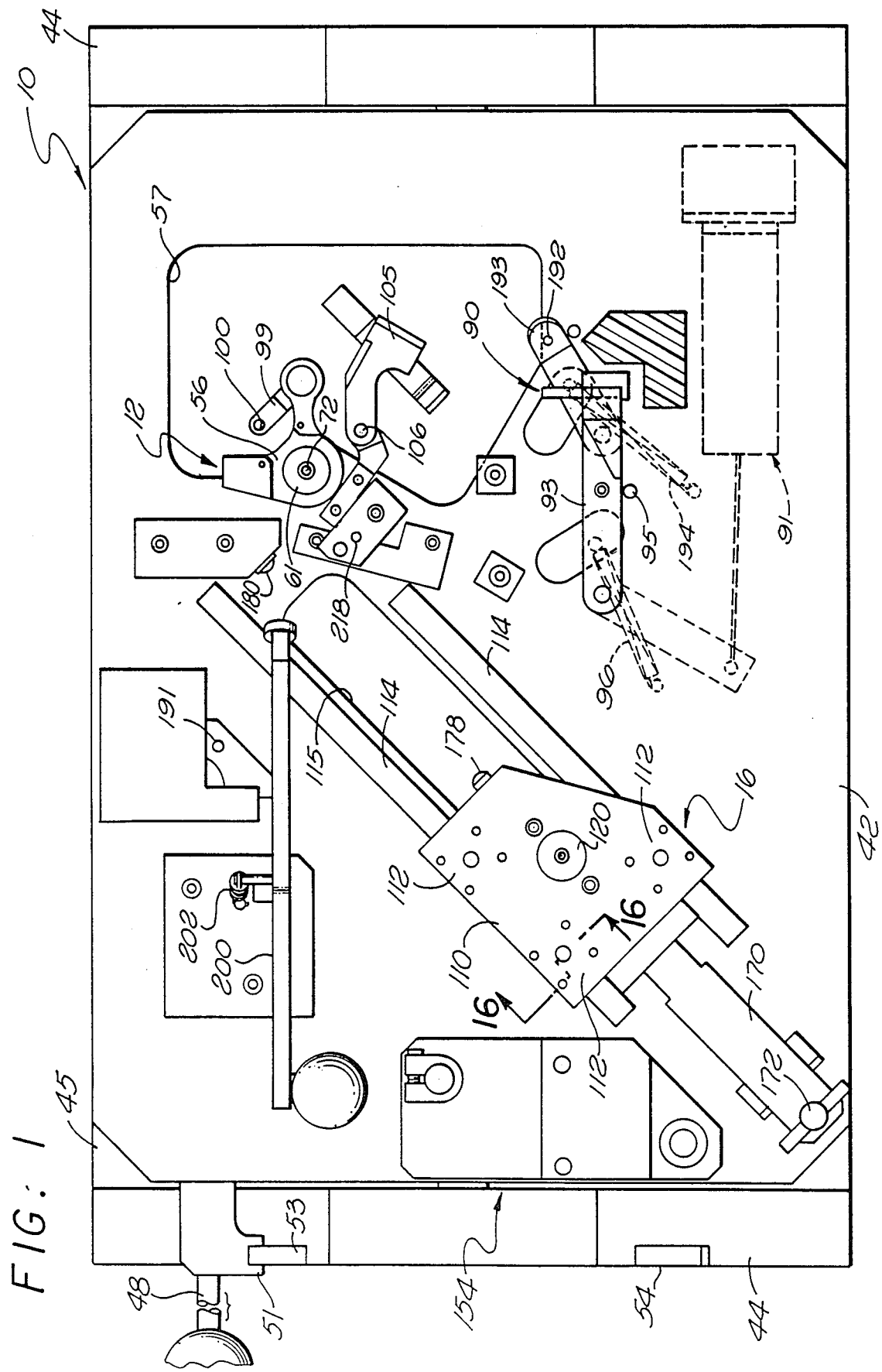
FIG. 1 is a top plan view illustrating a disk drive assembly station embodying the novel features of the invention.
Figure 2:
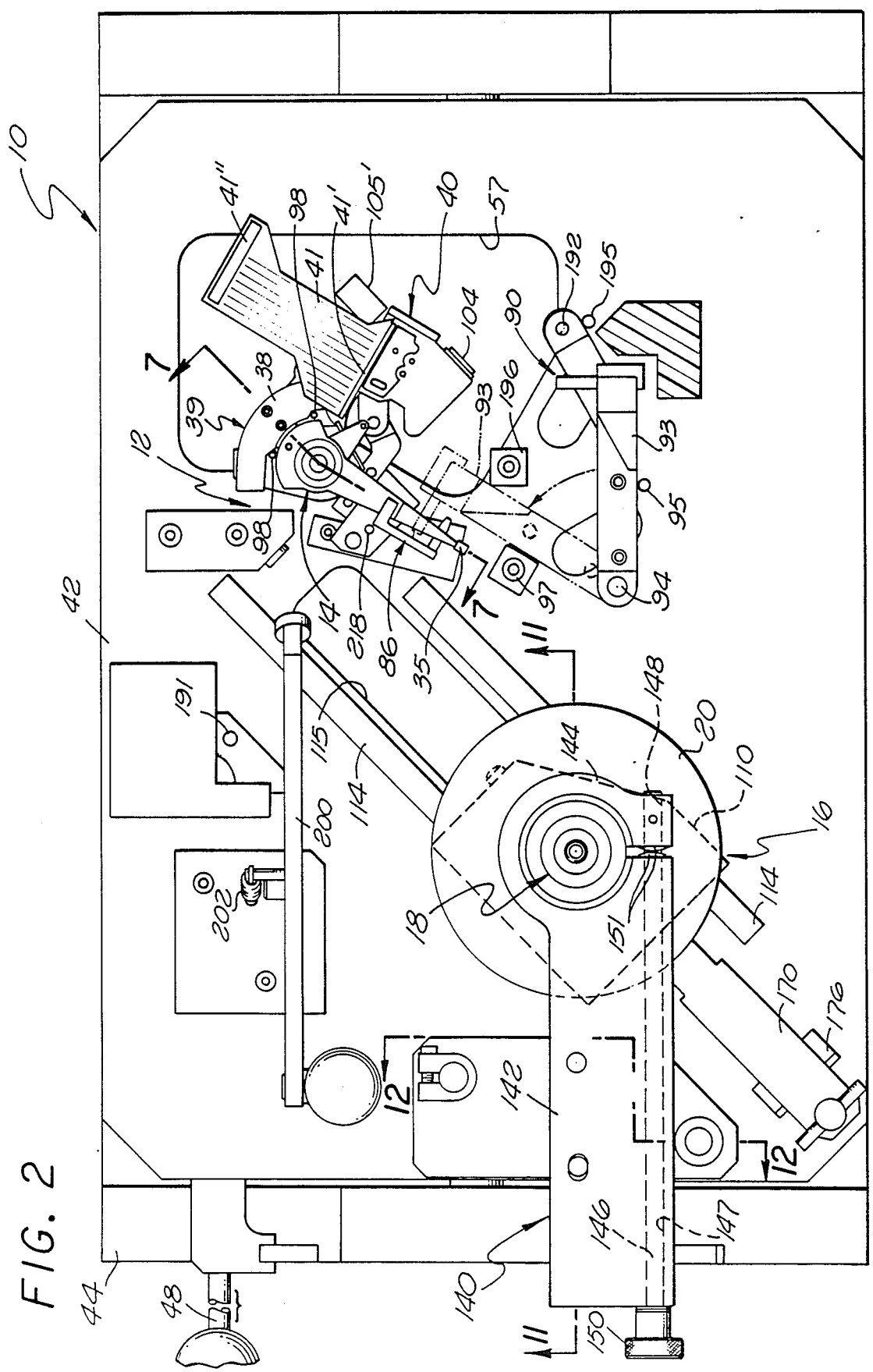
FIG. 2 is a top plan view similar to FIG. 1 but illustrating a head actuator subassembly and a disk subassembly of a disk drive unit installed onto the assembly station.
Figure 10:
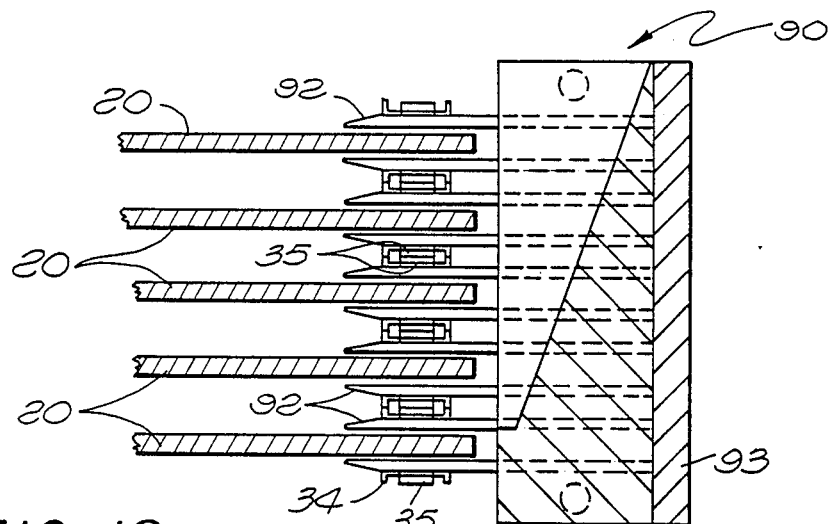
FIG. 10 is an enlarged fragmented vertical sectional view taken generally on the line 10—10 of FIG. 13.

As shown in the exemplary drawings, a disk drive assembly station referred to generally in FIGS. 1-3 by the reference numeral 10 is provided for facilitating precision assembly of key components of a disk drive unit of the type used in modern microcomputers, such as personal and desktop computers and the like. The disk assembly station 10 includes a head fixture 12 for precision support of a head actuator subassembly 14, as depicted in FIGS. 2 and 3. In addition, the station 10 includes a movable disk fixture 16 for supporting a disk subassembly 18 (FIG. 2) which may include multiple memory storage disks 20 arranged in a vertical stack (FIG. 10). The disk fixture 16 accommodates displacement of the supported disk subassembly 18 into precision positional registry with the actuator subassembly 14 (FIG. 13) to facilitate subsequent mounting of both subassemblies 14 and 18 within a housing base 22 (FIG. 3) of a computer disk drive unit.

The disk drive assembly station 10 of the present invention advantageously provides a relatively compact and easily manipulated apparatus and method for quickly and easily assembling key or precision components of a computer disk drive unit or the like. The assembly station 10 includes appropriate support members at predetermined and precision spaced locations for securely and safely supporting disk drive components for facilitated assembly. More specifically, a variety of disk drive components can be placed accurately and safely onto the head and disk fixtures 12 and 16 to orient those components in fixed predetermined relation to each other. The fixtures maintain the disk drive components in the desired positions during mounting of the housing base 22 which comprises a portion of a conventional, substantially sealed housing for the disk drive unit. Most importantly, the actuator subassembly 14 and the disk subassembly 18 are securely retained in a precision registration during mounting of the housing base such that substantially optimized cooperative interaction between these subassemblies may be achieved during operation of the disk drive unit in the course of storing and/or retrieving data.

Figure 14:
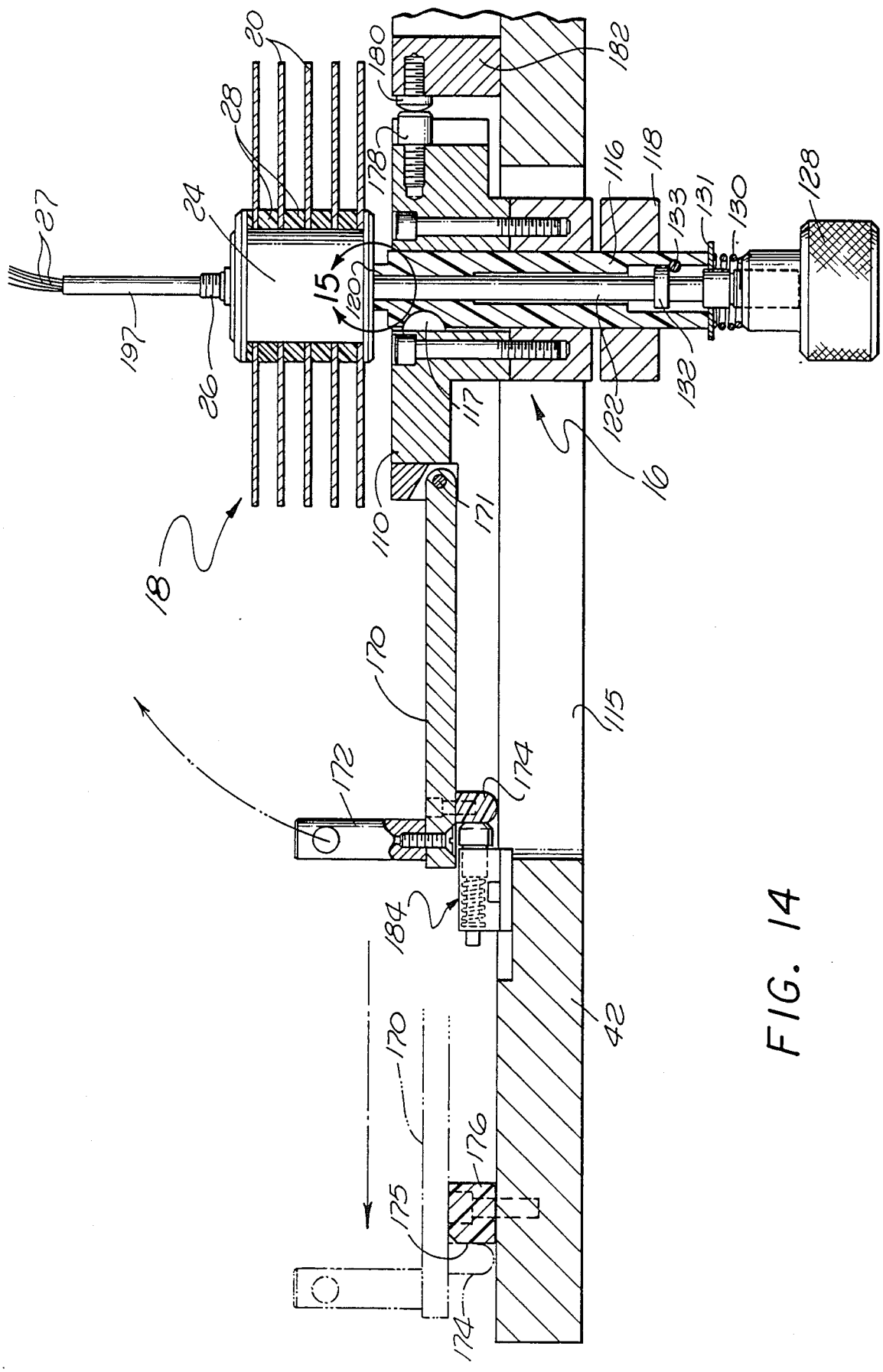
FIG. 14 is an enlarged fragmented vertical sectional view taken generally n the line 14—14 of FIG. 13.

Although a fully assembled disk drive unit is not shown in detail in the accompanying drawings, the assembly station 10 is particularly designed for use with disk drive units having the plurality of memory storage disks 20 arranged in a common stack to define the disk subassembly 18. More particularly, as shown best in FIG. 14, the disk subassembly 18 comprises a central cylindrical hub 24 encasing a built-in spindle drive motor having an axially elongated stator shaft 26. During disk drive operation, the stator shaft 26 is securely anchored by mounting, for example, of its opposite ends to components of the disk drive housing (not shown in FIG. 14) and electrical power is appropriately coupled to the spindle motor via plural leads 27 projecting from one end of the stator shaft 26. During spindle motor operation, the hub 24 is rotatably driven at a selected speed, typically about 3600 rpm, to correspondingly rotatably drive the hub 24 and the supported stacked plurality of the memory storage disks 20 in unison. Spacer rings 28 are interposed between the storage disks 20 to permit the upper and lower disk surfaces to be accessed by appropriate servo and/or read/write heads, as will be described in more detail. Any number of memory storage disks may be used, with FIG. 14 depicting five disks 20 arranged in a coaxial stack. Further details regarding a preferred disk subassembly and a related spindle drive motor may be found by reference to copending U.S. application Ser. No. 173,619, entitled DISK DRIVE SPINDLE MOTOR, which is incorporated by reference herein.

The head actuator subassembly 14 comprises another key component of the disk drive unit. An exemplary actuator subassembly 14 is shown in the accompanying drawings in conjunction with the disk drive assembly station 10. As best depicted in FIG. 7, the illustrative actuator subassembly 14 comprises a cast or machined casing 30 supported for rotation by means of an appropriate bearing (not shown) about a central support shaft 31. At least one and preferably both ends of the support shaft 31 are adapted for connection to the disk drive housing to orient the casing 30 for rotation about an axis generally parallel to the stator shaft 26 of the associated disk subassembly 18. The actuator casing 30 includes a plurality of relatively stiff arms 32 which radiate outwardly along a common azimuth and are secured by stake rings 33 or the like to a corresponding plurality of flexure arms 34. These flexure arms 34 in turn support electromagnetic read/write heads 35 or the like. As is known in the art, during operation of a disk drive unit, the heads 35 are positioned respectively in close proximity with individual surfaces of the associated memory storage disks 20 for purposes of reading and/or writing data. In the illustrative drawings, a total of six casing arms 32 are shown, with the upper and lower casing arms carrying single flexure arms 34 and associated heads 35 for respective association with the uppermost and lowermost storage disk surfaces of the subassembly 18. The remaining casing arms 32 each carry a pair of the flexure arms 34 which support read/write heads 35 oriented in opposite-facing directions for association respectively with the immediately overlying and underlying storage disk surfaces. When supported in registry with the disk subassembly 18, the read/write heads 35 are thus interleaved into the spaces between the storage disks 20 (FIG. 11), with the heads 35 disposed in individual read/write association with the storage disk surfaces. Further details regarding a preferred actuator subassembly 14 may be found by reference to copending application Ser. No. 173,618, entitled ACTUATOR ASSEMBLY FOR HARD DISK DRIVES, which is incorporated by reference herein.

The actuator subassembly 14 further includes means for controllably displacing the heads 35 through radial traverses relative to the storage disks 20 of the disk subassembly 18. While the particular mechanisms and methods used to obtain such displacement may vary, the accompanying drawings illustrate a movable coil dc motor having a bobbin or coil 36 carried by the actuator casing 30. The bobbin coil 36 is supported, during normal disk drive operation, in magnetically coupled association with permanent magnets 37 (FIG. 7) mounted within a housing 38 of a magnet unit 39. A solenoid unit 40 (FIG. 2) is also included as part of the actuator subassembly and includes a flex cable 41 for appropriately coupling signals from a system controller (not shown) to the bobbin coil 36 (FIG. 7) in a manner causing the coil to displace through an arcuate path in magnetic coupled relation with the permanent magnets 37 (FIG. 7). Such displacement effectively translates the read/write heads 35 through radial traverses relative to the associated disks 20. In addition, as known in the art, the flex cable 41 couples appropriate read/write signals to or from the plurality of heads 35. In this regard, the flex cable is shown to include an inboard connector fitting 41, anchored to a suitable location on the solenoid unit 40, and an outboard connector fitting 41" for appropriate coupling to the system controller at a position outside the housing of the disk drive unit.

The disk drive assembly station 10 of the present invention is particularly designed for facilitated and precision assembly of all the above-described disk drive components into the housing base 22 (FIG. 3). The assembly station supports the various components in predetermined, precision positions to accommodate simplified housing base affixation without requiring positional adjustment of components during or after assembly. The relative dimensions are fixed by the assembly station 10. Moreover, the assembly station 10 is adapted for facilitated manual assembly of the disk drive components, or for integration into an appropriate automated assembly process.

With reference to FIGS. 1–6, the disk drive assembly station 10 comprises a generally horizontally oriented platform 42 supported between left and right support standards 44. These support standards are adapted in turn for appropriate connection to an underlying support frame or base 45 which is suitably anchored in a stationary position. The platform 42 is supported from the standards 44 by a pair of coaxially aligned journal pins 46 (FIGS. 5 and 6) which are secured to the underside of the platform by clamp units 43 and project outwardly for reception into rotatable bearings 47 on the support standards 44. A lock lever 48 has an inboard end pivotally mounted to the underside of the platform 42 by a pin 49 (FIG. 19), and a spring 50 reacts between the lever 48 and the platform 42 to swing the lever 48 in a direction seating a lever tooth 51 normally into a notched seat 52 (FIG. 4) formed in a lock bracket 53 mounted on the adjacent support standard 44. The lock lever 48 may be withdrawn manually from the bracket seat 52 to permit platform rotation about the axis of the journal pins 46, thereby permitting platform inversion and corresponding reception of the lever tooth 51 into a notched seat in a second bracket 54 on the standard, as viewed in dotted lines in FIG. 4. Inversion of the platform 42 is performed during a latter stage of assembly of the disk drive unit, as will be described in more detail.

The head fixture 12 comprises a plurality of relatively small support members mounted on the platform 42 and cooperatively defining a series of upwardly presented surfaces for seated support of the actuator subassembly 14 and related components. For convenience and ease of description, these support members will be collectively referred to herein as a baseplate identified by the reference numeral 56. More specifically, with reference to FIGS. 1, 2 and 7-9, this baseplate 56 is suitably mounted by screws or the like onto the platform 42 at a position disposed generally along one side margin of a platform opening 57. An upright, generally cylindrical support sleeve 60 extends perpendicularly through the platform 42 and the baseplate 56 to define an upwardly presented annular reference surface 61 (FIG. 8). The support sleeve 60 is firmly engaged by a clamp unit 62 attached to the underside of the platform 42, as viewed in FIG. 9, wherein this clamp unit is appropriately adjusted to insure precision placement of the reference surface 61 in accordance with the desired geometry of the assembled disk drive unit. A key 63 may also be provided within aligned keyways on the support sleeve 60 and the platform 42 to positively lock the support sleeve 60 against rotation relative to the platform.

An elongated torque spindle 64 extends coaxially through the support sleeve 60 for use in attachment of the actuator subassembly 14 to the head fixture 12. As shown in FIGS. 7-9, this torque spindle 64 comprises an elongated shaft rotatably received through a bore formed in the support sleeve. A lower end 64' of the torque spindle 64 is threaded for screw-on attachment of an enlarged head 66 which conveniently includes external knurling or the like for easy manual grasping and rotation. A compression spring 67 reacts between a washer 68 at the lower end of the support sleeve 60 and an upwardly presented shoulder on the head 66 to urge the entire torque spindle 64 downwardly within the support sleeve 60. A raised spool 69 or the like on the torque spindle 64 is engageable with a stop key 70 extending transversely through the support sleeve 60 to define a lower end limit to torque spindle motion.

The upper end of the torque spindle 64 is shaped to define a cylindrical land 71 (FIG. 8) of reduced diametric size. The land 71 projects upwardly a short increment above the adjacent reference surface 61 on the support sleeve 60. The upper extent of the land 71 joins with a threaded upper tip 72 for threaded attachment to the actuator subassembly. Such threaded attachment is achieved by engaging the tip 72 into a threaded bore 73 at one end of the support shaft 31 of the actuator subassembly 14. In this regard, in the preferred form of the invention, this threaded bore 73 is formed in the upper end of the support shaft 31, whereby the actuator subassembly is installed onto the head fixture 12 in an inverted orientation, as viewed in FIG. 7. Rotation of the torque spindle 64 is obtained easily by grasping and rotating the spindle head 66 at a position below the platform 42 to draw and seat the axially uppermost end of the support shaft 31 firmly onto the reference surface 61 at the upper end of the support sleeve 60. When the tip 72 is threaded into the shaft bore 73 with a predetermined torque load, the compression spring 67 permits override rotation of the head 66 relative to the spindle 64 to prevent overtightening.

A spring loaded alignment pin 76 is also provided for registration with the actuator subassembly 14 to insure precise initial placement of said subassembly 14 onto the head fixture 12. More specifically, as shown best in FIGS. 7 and 9, the alignment pin 76 is carried for axial sliding movement within a guide sleeve 77 which extends generally perpendicularly through the platform 42 at a position closely adjacent to the support sleeve 60. This guide sleeve 77 is suitably mounted onto the platform to extend generally perpendicularly therethrough by means of a clamp unit 78 or the like fastened onto the underside of the platform. A key 79 may also be provided to prevent relative rotation of the guide sleeve with respect to the platform 42.

The alignment pin 76 protrudes upwardly through the baseplate 56 and terminates in a tapered upper tip 80 for reception into a port defined, for example, by the stake ring 33 anchoring the adjacent upper flexure arm 34 of the subassembly 14. The tip 80 is spring biased for normal reception into the stake ring port by means of a lower compression spring 82 reacting between a stop ring 83 on the pin 76 and an inboard surface of a sleeve cap 84 mounted onto the lower of the guide sleeve 77. A head 85 is secured onto the exposed lower end of the alignment pin 76 in a position for easy manual grasping below the platform to withdraw the pin tip 80 from the adjacent stake ring port. However, when the head 85 is released, the spring 82 urges the alignment pin 76 to translate upwardly within the guide sleeve 77, thereby displacing the tapered tip 80 into the stake ring port. As a result, the alignment pin 76 cooperates with the torque spindle 64 for normally locking the inverted actuator subassembly 14 in position on the head fixture 12.

The stake rings 33 on the plurality of actuator arms 32 conventionally define a vertically aligned series of stake ring ports. These stake rings 33 provide a convenient mounting structure for a shipping comb 86 having a plurality of spaced teeth 87. The comb teeth 87 are interposed between the multiple flexure arms 34 to maintain the read/write heads 35 in spaced relation during manufacturing and/or shipping processes. The shipping comb 86 is shown best in FIGS. 2 and 7, and is normally secured in a releasable manner to the actuator subassembly 14 by means of a short mounting post 88 received through the ports in two or more of the stake rings 33. Importantly, as viewed in FIG. 7, the mounting post 88 is received through the stake rings located generally opposite the alignment pin 76 when the subassembly 14 is installed onto the head fixture 12. With this arrangement, the head actuator subassembly 14 can be installed onto the disk assembly station 10 without requiring prior removal of the shipping comb 86.

The shipping comb 86 is removable quickly and easily from the actuator subassembly 14 subsequent to subassembly mounting onto the head fixture 12. More particularly, as shown in FIGS. 1, 2, 10 and 13, a loading comb 90 includes a plurality of comb teeth 92 disposed in a vertical spaced array at the distal end of a comb pivot arm 93. This pivot arm 93 is pivotally mounted b a pin 94 to the main platform 42 in a manner accommodating swinging movement of the loading comb 90 into or away from registration with the actuator subassembly 14 on the head fixture 12. When the actuator subassembly 14 is secured onto the head fixture 12, the comb pivot arm 93 is rested at an out-of-the-way position, as viewed in solid lines in FIG. 2, to space the loading comb teeth 92 a substantial distance from the subassembly 14. A limit post 95 on the platform 42 conveniently provides a stop engaging the comb arm 93 in this out-of-the-way position. An over-center spring 96 (FIGS. 1 and 19) secured between the platform 42 and the comb arm 93 effectively retains the arms 93 against the limit post 95.

Figure 19:
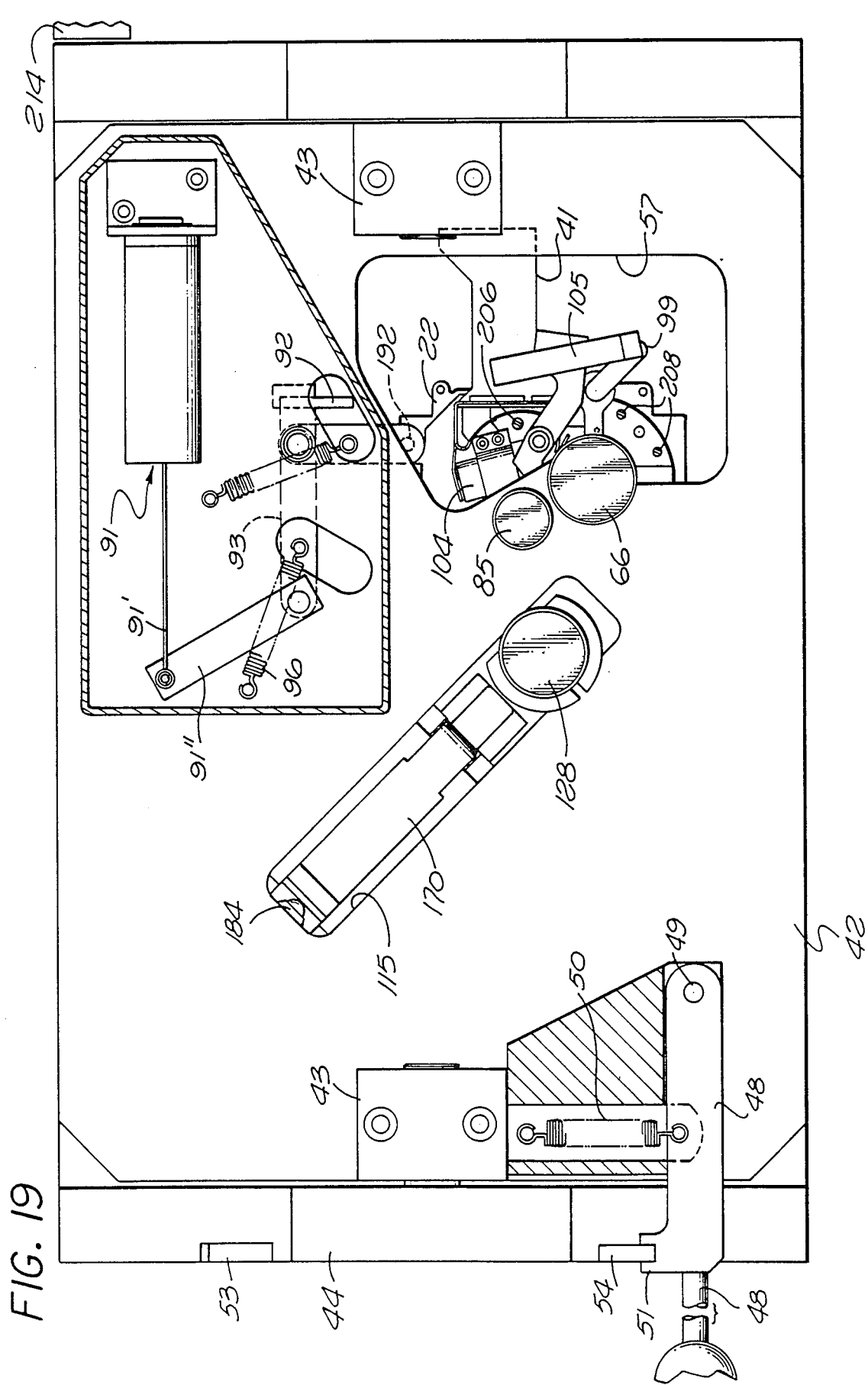
FIG. 19 is a plan view illustrating a main platform of the assembly station in an inverted orientation.

However, subsequent to subassembly mounting onto the head fixture 12, the comb pivot arm 93 is pivoted to displace the comb teeth 92 toward the flexure arms 34 of the actuator subassembly 14. As shown in FIG. 10, the leading edges of the comb teeth 92 are appropriately tapered to fit smoothly into the spaces between the flexure arms 34 in a manner retaining the operating surfaces of the read/write heads 35 against contact with each other. Further advancement of the comb teeth 92 (shown in dotted lines in FIG. 2) effectively releases the teeth 87 of the shipping comb 86. This permits relatively easy shipping comb removal by simple pivoting of the comb teeth 87 away from the heads 35 and appropriate lifting of the comb post 88 from the stake rings 33. The removed shipping comb 86 may be discarded, or reused, as desired. A second limit post 97 on the platform 42 prevent overtravel of the loading comb pivot arm (FIG. 2). Moreover, as shown in FIGS. 1 and 19, a dashpot assembly 91 is conveniently mounted to the underside of the platform 42 and has a ram 91' coupled through a link 91" to the comb pivot arm 93 to insure gentle swinging movement of the pivot arm in either direction relative to the head fixture 12.

Figure 22:
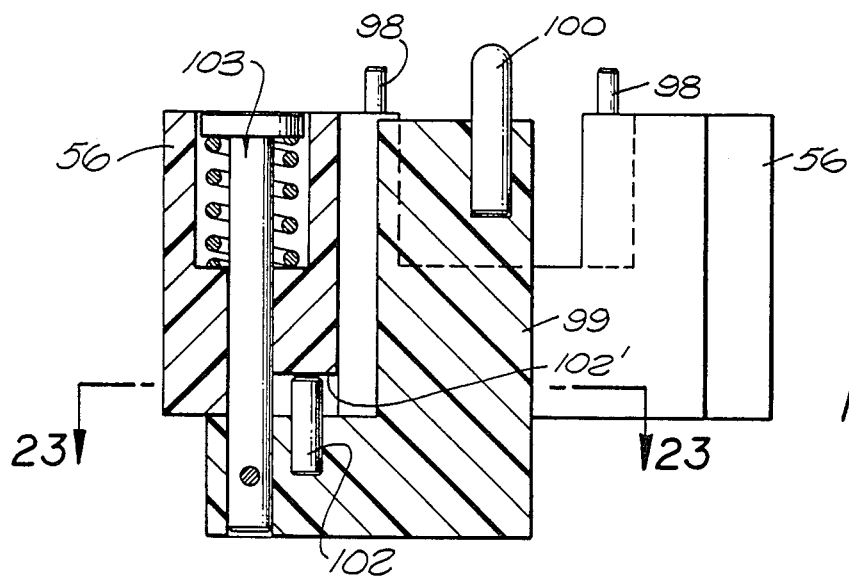
FIG. 22 is a fragmented vertical sectional view taken generally on the line 22—22 of FIG. 20.
Figure 23:
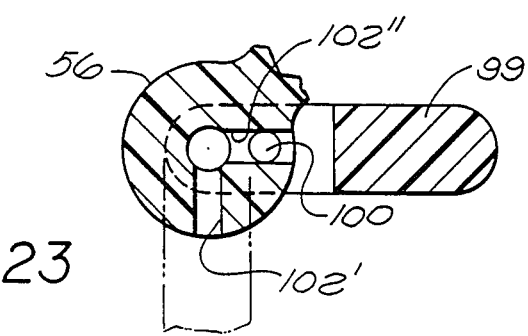
FIG. 23 is a fragmented horizontal sectional view taken generally on the line 23—23 of FIG. 22.

Additional disk drive unit components are also installed at the rear of the actuator assembly 14, as viewed in FIGS. 2, 7, 13 and 17 to position the magnets 37 (FIG. 7) in operative relation with the bobbin coil 36. In this regard, for secure and precise support of the magnet unit 39, the fixture baseplate 56 includes a pair of upstanding locator pins 98 (FIG. 20) positioned adjacent to the casing 30 of a supported actuator subassembly 14. In addition, a pivot link 99 (FIGS. 20, 22 and 23) mounted swingably to the baseplate 56 includes an upstanding post 100 for reception into a port 101 in the magnet housing 38 to support the magnet unit 39 in registry with the bobbin coil 36 (FIG. 7). As viewed in FIGS. 20, 22 and 23, this pivot link 99 is normally locked an an out-of-the-way position (dotted lines in FIG. 20) by means of a retainer pin 102 (FIG. 22) urged by a spring unit 103 into a slot 102' in the baseplate. However, with the magnet unit 39 seated against the locator pins 98, the retainer pin 102 can be retracted from the slot 102' to permit pivot link rotation to a secondary position with the post 100 aligned for reception into the magnet housing port 101 (FIG. 7) (solid lines in FIG. 20). In this secondary position, the pivot link 99 is released whereupon the spring unit 103 urges the post 100 into the housing port 101 (FIG. 7) to hold the magnet unit 39 in place. A second slot in the baseplate receives the retainer pin 102 to releasably lock the pivot link 99 and the supported magnet housing in place.

Figure 13:
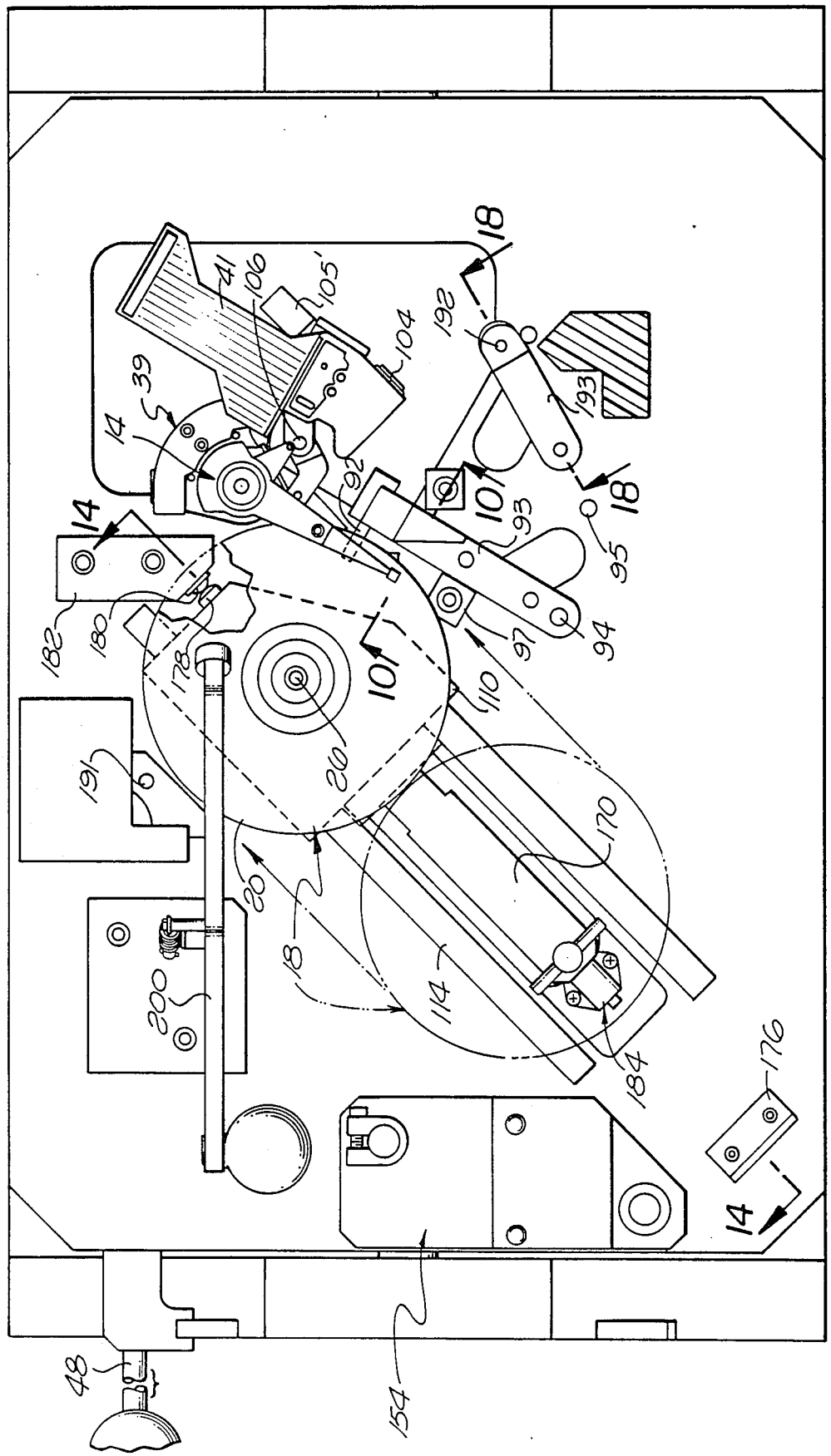
FIG. 13 is a top plan view of the assembly station corresponding generally with FIG. 2, but illustrating displacement of the disk subassembly into precision registration with the actuator subassembly.

The actuator subassembly 14 additionally includes the solenoid coil 40 with associated flex cable 41 and a solenoid latch mechanism 104. These components are coupled generally to one side of the actuator casing 30, as viewed in FIGS. 2, 13, 17, 20 and 21. A solenoid support bracket 105 projects laterally from one side of the baseplate 56 in generally cantilevered relation over the platform opening 57. This support bracket 105 is geometrically shaped for rested, seated support of the solenoid latch mechanism 104 and the associated flex cable 41, with the flex cable folded in a direction generally away from the head fixture 12 (FIG. 2). As shown best in FIGS. 13, 17, 20 and 21, the solenoid support bracket 105 (FIGS. 20 and 21) is beneficially mounted to the platform 42 by a pivot pin 106 or the like for initially supporting the solenoid unit 40 in a position pivoted away from the actuator subassembly (FIGS. 1 and 13). However, immediately prior to installation of the housing base 22 (FIG. 3) the solenoid bracket 105 is pivoted in a direction swinging the solenoid unit 40 toward the subassembly 14 (FIGS. 17, 20 and 21) for fastening into the housing base 22, as will be described.

The disk fixture 16 includes a separate baseplate 110 adapted to receive and support the disk subassembly 18. Importantly, this baseplate 110 is movably mounted with respect to the platform 42. With this construction, the disk subassembly 18 can be installed onto the baseplate 110 in an initial position spaced sufficiently from the head fixture 12 to prevent accidental contact of the subassemblies with each other. However, while the flexure arms 34 of the actuator subassembly 14 are appropriately held in spread relation by the loading comb 90, the disk fixture 16 including the baseplate 110 is movable quickly and easily to displace a supported disk subassembly 18 into precision registration with the multiple read/write heads 35 of the actuator subassembly 14.

Figure 11:
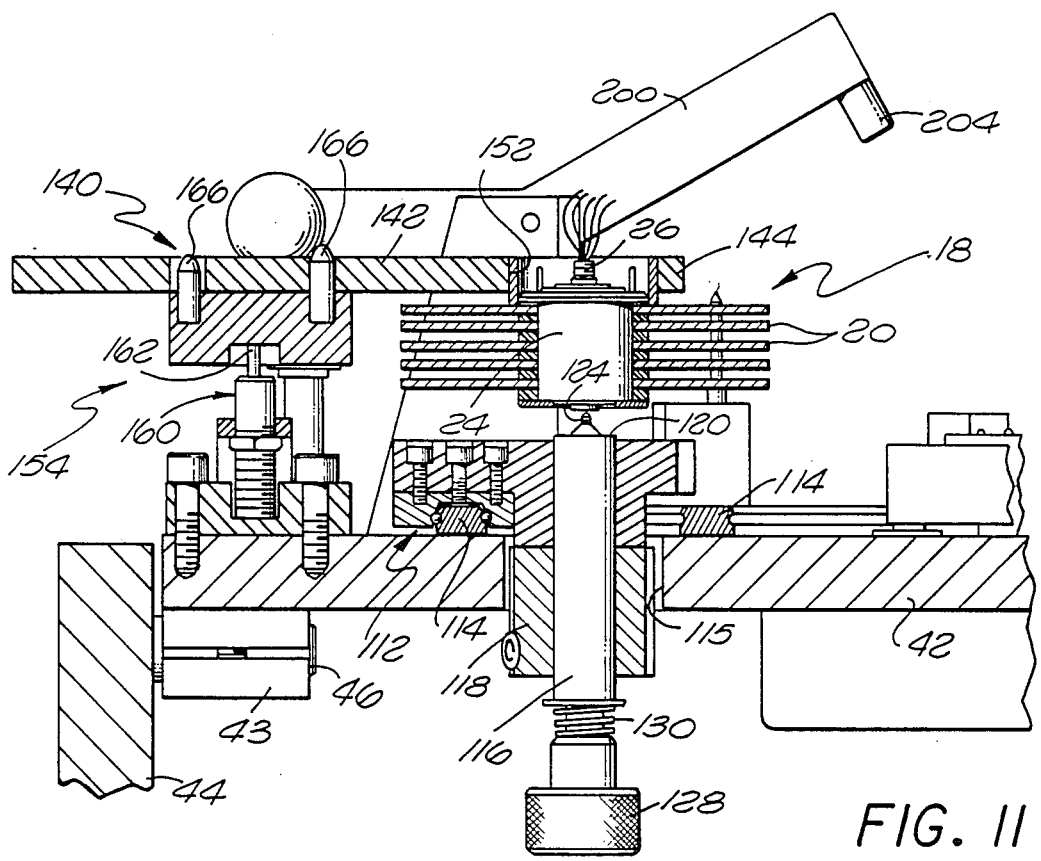
FIG. 11 is an enlarged fragmented vertical sectional view taken generally on the line 11—11 of FIG. 2.
Figure 12:
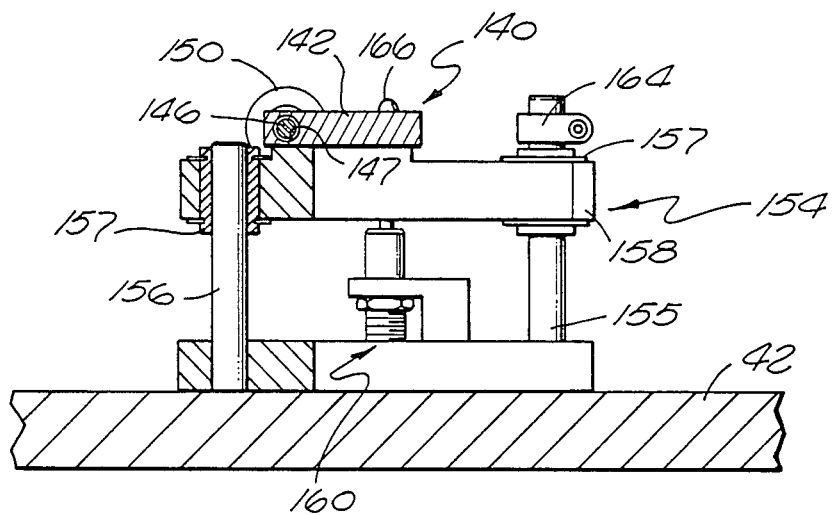
FIG. 12 is an enlarged fragmented vertical sectional view taken generally on the line 12—12 of FIG. 2.

More specifically, with reference to FIGS. 1-3 and 11-17, the baseplate 110 is supported by a plurality of three or more linear bearing units 112 (FIGS. 1 and 11) for substantially straight-line sliding displacement along a pair of parallel guide rails 114 mounted securely upon the platform 42. As shown in FIGS. 11 and 14, the baseplate 110 is supported over an elongated opening 115 in the platform 42. As upright support sleeve 116 is secured to the baseplate 110 by means of a clamp unit 118 or the like to extend generally perpendicularly through the platform opening 115 and the baseplate 110. A key 117 may also be provided to lock the support sleeve 116 against rotation with respect to the baseplate 110. The support sleeve 116 defines an upwardly presented annular reference surface 120 (FIGS. 11 and 15) which surrounds an elongated torque spindle 122 passing coaxially through the support sleeve 116. The upper end of the torque spindle 122 defines a tapered truncated conical seat 123 (FIG. 15) of relatively fine tolerance dimensions and which blends into an upwardly projecting threaded tip 124. The geometry of the conical seat 123 and the threaded tip 124 are adapted for precision threading advancement into a tapered entrance 125 leading to a threaded bore 126 formed in the stator shaft 26 of a disk subassembly 18.

When the disk subassembly 18, including the stacked array of memory storage disks 20, is mounted onto the disk fixture 16, the disk subassembly 18 is oriented in an inverted position for thread-in advancement of the torque spindle tip 124 into the upper end of the stator shaft 26. Such threaded advancement is achieved by grasping and rotating an enlarged head 128 threaded onto a threaded lower end of the torque spindle 122 (FIG. 14) at a position below the platform. A compression spring 130 reacts between a washer 131 seated against the lower end of the support sleeve 116, and an upper shoulder on the head 128 to urge the torque spindle downwardly within the support sleeve 116 with a predetermined spring force. An enlarged spool 132 on the torque spindle 122 is engageable with a stop key 133 inserted through the support sleeve 116 to provide a downward end limit stop to torque spindle motion within the support sleeve. Accordingly, threaded advancement of the tip 124 into the stator shaft 26 draws the end of the stator shaft into seated relation with the reference surface 120 with a limited force controlled by the design characteristics of the spring 130. When that force is achieved, further rotation of the head 128 overrides relative to the torque spindle 122. Importantly, when the disk subassembly 18 is seated onto the reference surface 120, a precision positional relationship between the actuator and disk subassemblies is obtained.

A transfer tool 140 may be provided for facilitated handling of the disk subassembly 18 during mounting thereof onto the disk fixture 16. The transfer tool 140, shown best in FIGS. 2, 11 and 12, comprises an elongated and relatively rigid tool body 142 having a split clamp head 144 at one end thereof. A clamp screw 146 extends through an elongated smooth bore 147 in the tool body to bridge the split in the clamp head 144 and for threading into a threaded bore 148 (FIG. 11). When the clamp screw 146 is advanced into the threaded bore 148, a head 150 on the screw bindingly engages a rear tool face to cause a pair of facing stops 151 at the clamp head split to be drawn into abutting engagement with each other (FIG. 2). When the stops 151 are engaged, an interior surface 152 of the clamp head 144 bindingly engages a relatively rigid structural peripheral portion of the hub 24 of the disk subassembly 18 for securely holding the subassembly without the use of direct manual assistance. With this transfer tool 140, the disk subassembly 18 can be handled and transferred manually or with automated equipment for rapid and accurate placement onto the disk fixture 16 in an inverted position.

A tool support stand 154 is mounted on the platform 42 for receiving the transfer tool 140 having a disk subassembly 18 loaded therein. As viewed in FIGS. 1, 11 and 12, the tool stand 154 includes a pair of upstanding guide posts 155 and 156 projecting upwardly from the platform 42 to extend slidably through bearings 157 (FIG. 12) carried by an upper plate 158. A dashpot unit 160 on the platform 42 has a spring loaded ram 162 for urging the plate 158 to a position near the upper ends of the posts 155 and 156, and a clamp unit 164 or the like is fastened onto the upper end of the post 155 to prevent plate removal therefrom. An upper face on the plate 158 defines a relatively flat support surface for rested reception of the transfer tool 140. Guide pins 166 project upwardly from the plate 158 through aligned ports in the transfer tool body such that a disk subassembly 18 carried by the transfer tool is disposed in alignment over the torque spindle 122 of the disk fixture 16. Threaded advancement of the spindle tip 124 draws the disk stack firmly onto the reference surface 120, as previously described, with such draw-down motion being resisted by the support stand dashpot unit 160 to insure smooth motion without jarring or jolting which could otherwise damage the fragile disk subassembly.

As shown in FIGS. 1, 2, 13 and 14, the disk subassembly 18 is mounted onto the disk fixture 16 while the fixture is positioned in significantly spaced relation from the head fixture 12. A push bar 170 is connected by a pivot pin 171 to an outboard side edge of the baseplate 110 and projects outwardly therefrom in a direction generally away from the head fixture 12. This push bar 170, as viewed best in FIGS. 3 and 14, includes an upstanding handle 172 for easy manual grasping to displace the entire fixture 16 along the guide rails 114 toward and away from the head fixture 12. In an initial position, as viewed in dotted lines in FIG. 14, a depending lock tab 174 on the push bar 170 seats against an outboard side face 175 of a raised stop member 176 mounted on the platform 42.

However, subsequent to securement of the disk subassembly 18 onto the disk fixture 16, the push bar 170 is pivoted upwardly from the dotted line position (FIG. 14) and used as a push handle for displacing the disk fixture 16 along the guide rails 114 in a direction toward the actuator subassembly 14 on the head fixture 12. A pair of hardened stops 178 and 180 such as the heads of a pair of screws on the baseplate 110 and on a stop plate 182, respectively, are engageable to define a precision stop point for the disk fixture 16 to orient the disk subassembly in precision registration with the actuator subassembly. In this position, the memory storage disks 20 of the disk subassembly 18 are disposed in predetermined and interleaved registry with the read/write heads 35, as shown in FIG. 10. When this position is reached, the push bar 170 is pivoted downwardly toward the solid line position viewed in FIG. 14 to seat the stop tab 174 engaged in front of a spring loaded lock button unit 184 mounted on the platform. This lock button unit 184 beneficially retains the disk fixture 16 in a position with the stops 178 and 180 securely engaged to maintain the disk and head subassemblies in precision registration seated respectively on the head and disk fixtures.

With the actuator and disk subassemblies 14 and 18 in registered relation, the loading comb 90 (FIG. 10) is retracted from the flexure arms 34. Such retraction is obtained by swinging the comb arm 93 away from the actuator subassembly to release the flexure arms 34 gradually due to the tapered geometry of the tips of the comb teeth 92. As a result, the read/write heads 35 land gently upon outer landing zones of their respective disk surfaces with a predetermined preload in accordance with the spring characteristics of the flexure arms. An upstanding housing 186 (FIG. 3) is conveniently provided on the platform 42 to at least partially shelter the loading comb 90 when retracted from the actuator subassembly.

Figure 17:
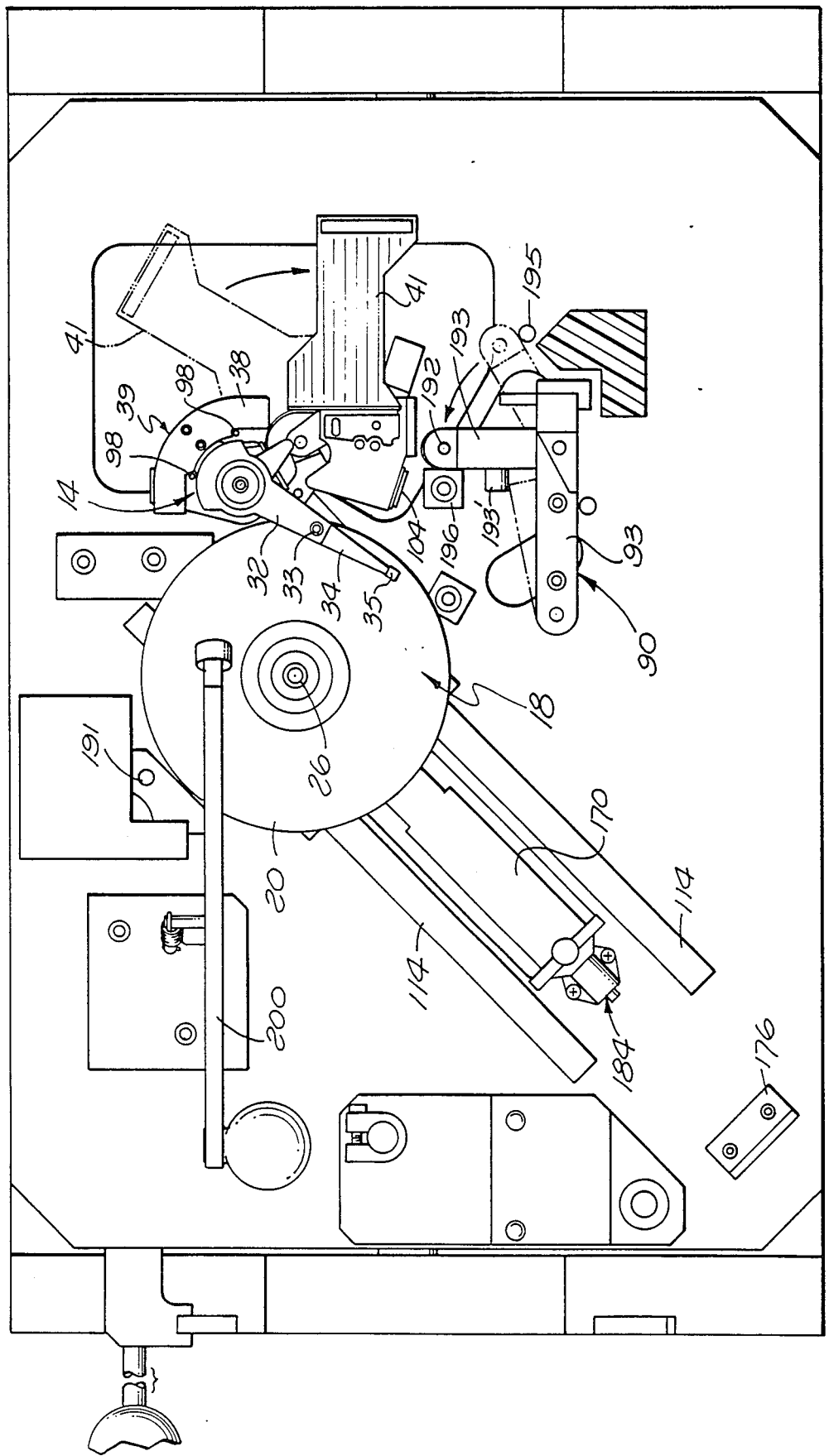
FIG. 17 is a top plan view corresponding generally with FIG. 13, but illustrating displacement of a solenoid unit to a final mounting position in association with the actuator assembly.
Figure 20:
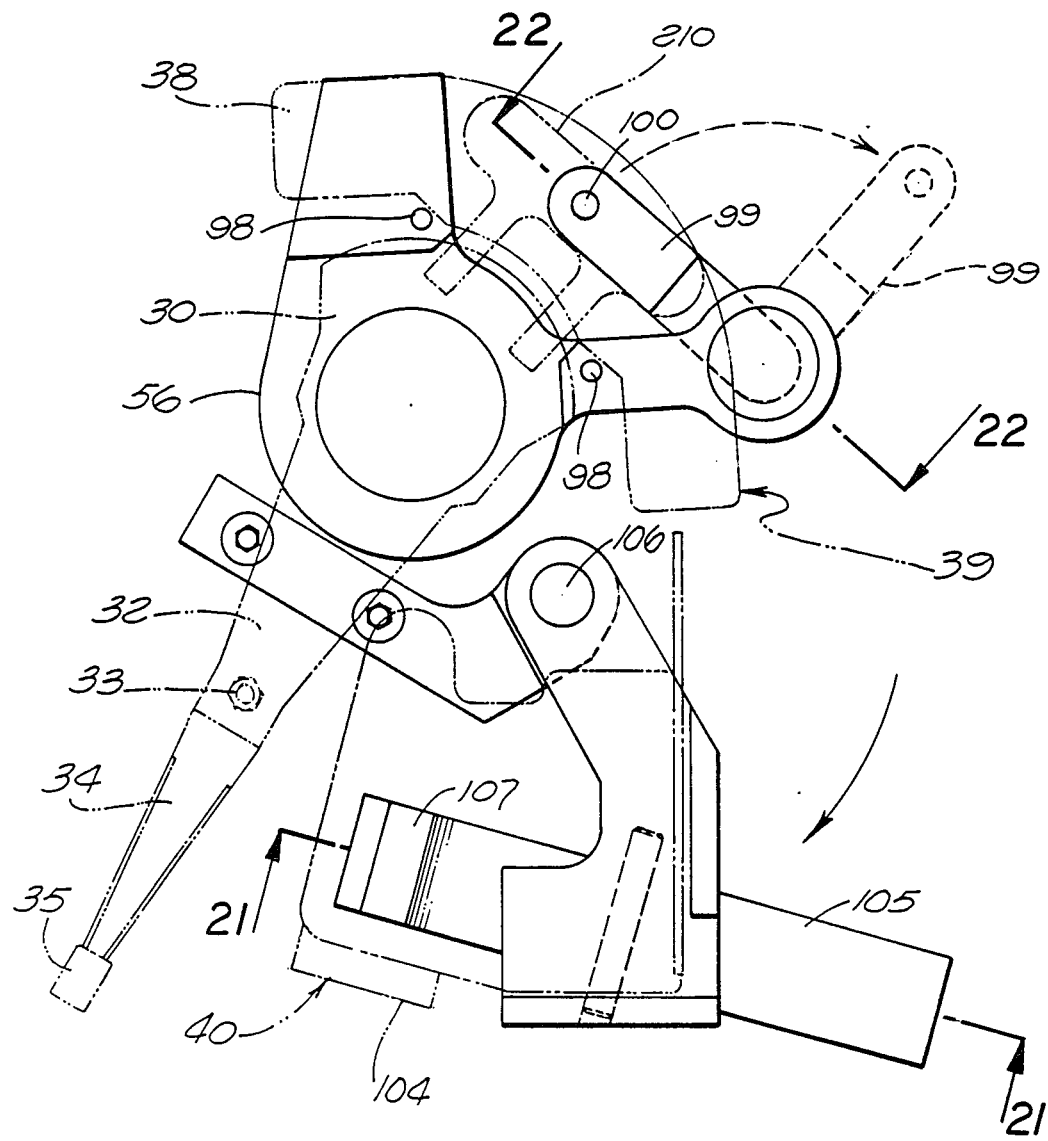
FIG. 20 is a somewhat schematic plan view depicting mounting of components utilized with the head actuator subassembly and related solenoid unit.
Figure 21:
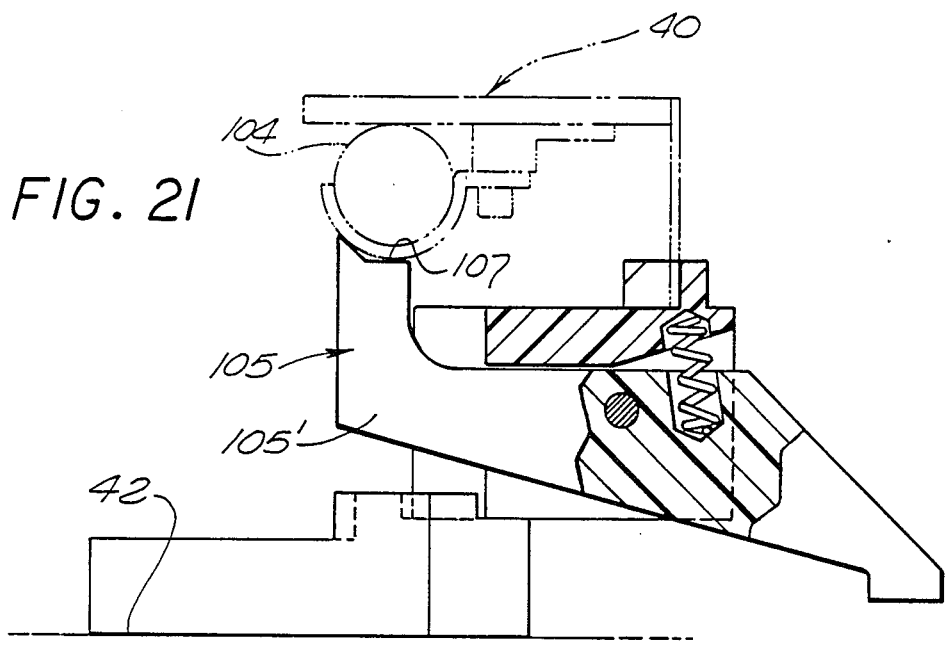
FIG. 21 is a fragmented vertical sectional view taken generally on the line 21—21 of FIG. 20.

In addition, subsequent to movement of the disk subassembly 18 into registration with the actuator subassembly 14, the solenoid bracket 105 is movable to displace the solenoid unit 40 into a desired mounting position relative to the actuator subassembly. More particularly, as shown in FIGS. 17, 20 and 21, the solenoid bracket 105 is pivotally movable about the pivot pin 106 to displace the solenoid latch mechanism 104 to a position in close proximity with the actuator casing 30. In this regard, as viewed in FIG. 21, the bracket 106 includes a spring loaded bracket arm 105, having a contoured seat 107 for cradled support of the latch mechanism 104.

Figure 18:
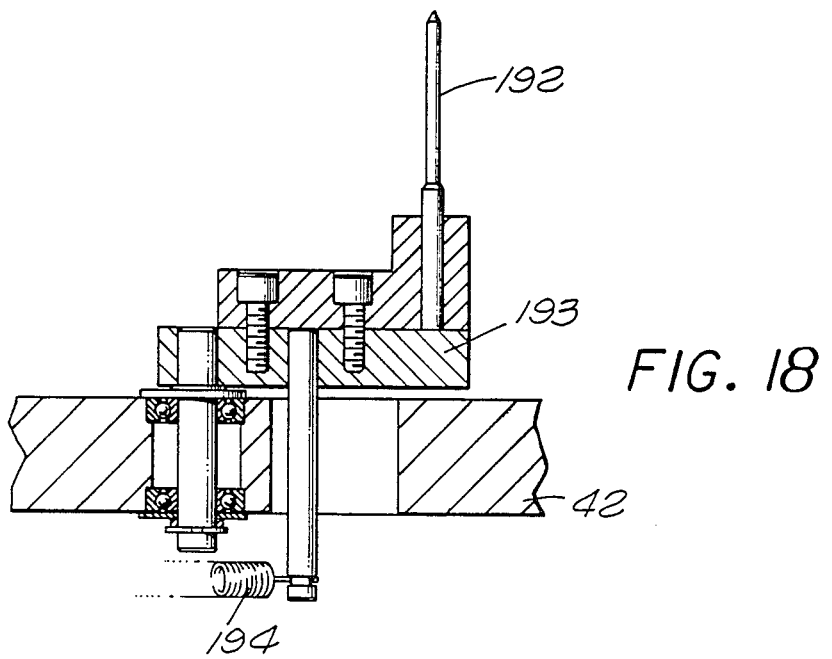
FIG. 18 is an enlarged fragmented vertical sectional view taken generally on the line 18—18 of FIG. 13.
Figure 16:
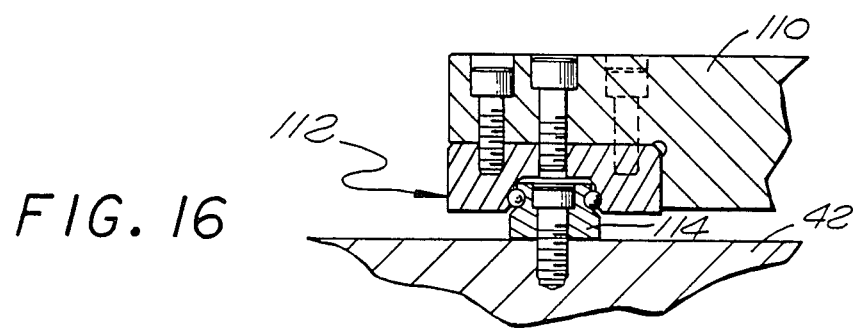
FIG. 16 is an enlarged fragmented vertical sectional view taken generally on the line 16—16 of FIG. 1.

The housing base 22 is then installed quickly and easily onto the above-described components of the disk drive unit for secure connection thereto. More particularly, the housing base 22 comprises a contoured housing component having at least two alignment ports 190 for receiving upstanding cover pins 191 and 192 which guide the base 22 into the desired positional registry with the underlying subassemblies. One of these ports 190 in the housing base 22 is adapted to receive the upwardly projecting cover pin 191 which is supported in a fixed position at one side of the platform 42. The second cover pin 192 is conveniently carried by a spring loaded swing arm 193 for swinging displacement relative to the platform. This second pin 192 and the related swing arm 193 are shown in detail in FIG. 18, with an over-center spring 194 controlling swing arm displacement between first and second positions. In a first position, as viewed in FIGS. 1, 2 and 13, the cover pin 192 is in an out-of-the-way position to avoid interference With assembly of other components. However, when housing base installation is desired, the swing arm 193 is displaced to the second position (FIGS. 3 and 17) and retained thereat by the spring 194. A pair of stop posts 195 and 196 conveniently define the termination points for the two positions of swing arm displacement. Moreover, the swing arm 193 conveniently includes a side abutment 193' to block motion of the comb support arm 93 toward the actuator subassembly 14 when the cover pin 192 is in the second position for engaging the housing base 22.

With the cover pin 192 moved to its second position near the actuator subassembly 14, the housing base 22 is placed onto the underlying disk drive components by sliding the housing base downwardly with the pins 191 and 192 received into the ports 190. Importantly, the cover pins 191 and 192 have sufficient height to insure proper reception through the ports 190 prior to contact by the housing base 22 with either subassembly 14 or 18. Such arrangement advantageously insures proper alignment among the components before physical contact therebetween. Moreover, for facilitated assembly, the spindle leads 27 projecting upwardly from the disk drive spindle motor are advantageously gathered within a short straw 197 (FIGS. 3 and 14) for easy passage through an aligned opening 198 in the housing base. When the housing base 22 is properly seated upon the underlying components, appropriate nuts and/or screws are used for securely fastening the housing base to the actuator subassembly 14 and to the disk subassembly 18, respectively.

Subsequent to installation of the housing base 22, the straw 197 is removed from the spindle leads 27 to permit the leads to be appropriately coupled by soldering or the like to a flex cable segment 27' or the like adapted for connection to power supply components of a fully assembled disk drive unit. In addition, a clamp arm 200 may be displaced into supporting engagement with the housing base 22, as viewed best in FIGS. 3 and 11. This clamp arm 200 comprises a crank pivotally mounted onto the platform 42 and biased by an over-center spring 202 (FIG. 2) for movement between two different positions. In a first position, as shown in FIG. 11, a clamp foot 204 is spaced above the various components being assembled on the platform fixtures. However, after installation of the housing base 22, the clamp foot 204 can be descended to engage an upwardly presented surface of the housing base 22 to assist in holding the partially assembled disk drive components on the assembly station, as shown in FIG. 3.

In the partially assembled stage shown in FIG. 3, the platform 42 is rotated to an inverted position to facilitate final assembly of the various components to the housing base 22. More specifically, the lock lever 48 is released from the adjacent lock bracket 53 to permit platform inversion by rotation about the axis of the journal pins 46 (FIG. 4). In the inverted position, the tooth 51 on the lock lever 48 is engaged with the second lock bracket 54 to lock the platform in place. As shown in FIG. 19, the inverted platform exposes portions of the partially assembled disk drive unit through the platform opening 57. In this position, one or more screws 206 can be fastened quickly and easily into the housing base 22 to secure the solenoid unit 40 in place. In addition, appropriate screws 208 can be fastened through the magnet unit 39 to secure the unit to the housing base. Moreover, a position stop plate 210 of the magnet unit 39 (FIG. 20) can be precisely adjusted to control the swing range of the actuator heads 35 relative to the disks 20.

While the platform 42 is in the inverted position, as shown in FIG. 19, the flex cable segment attached to the spindle leads 27 of the spindle drive motor can be coupled to an appropriate power supply fitting 214 as shown schematically in FIG. 19. This power supply fitting 214 provides electrical power to activate the spindle drive motor to spin up the disks 20 substantially to normal operating speed. When this occurs, the read/write heads 35 of the actuator subassembly lift off or fly in slight spaced relation to the associated disk surfaces. During such operation, the actuator arms 32 can be grasped manually through the platform opening 57 and rotated relative to the disks to reposition the heads 35 at inner landing zones on the disks. Such actuator displacement requires, of course, retraction of the alignment pin 76 by pulling upwardly on the now-exposed head 85 of the alignment pin. A stop pin 218 (FIGS. 1 and 2) conveniently defines an end limit to head displacement to align the heads 35 at the disk inner landing zones. When this position is reached, the solenoid latch mechanism 104 can be adjusted as required to effectively park and lock the heads 35 in place.

When the read/write heads 35 are securely latched at the inner landing zone positions, the platform 42 is returned quickly and easily to the upright orientation as viewed in FIGS. 1–18. Such return movement requires disconnection of the spindle motor from the power supply fitting 214, together with appropriate operation of the lock lever 48 to permit platform rotation relative to the standards 44. The lock lever 48 is re-engaged with the bracket 53 to relock the platform 42 in the upright orientation. The clamp arm 200 is quickly and easily retracted from the housing base 22 to permit easy removal of the partially assembled disk drive unit from the assembly station 10 by straight lift-off with respect to the cover pins 191 and 192. The partially assembled unit includes the actuator and disk subassemblies 14 and 18 in precision registration ready for subsequent final assembly, for example, by mounting of a housing cover (not shown) onto the housing base 22.

A variety of modifications and improvements to the disk drive assembly station 10 of the present invention will be apparent to those skilled in the art. For example, the clamp units securing the torque spindle support sleeves onto the platform may be adjusted as required to accommodate relocation of the support sleeve reference surfaces according to the design characteristics of the particular disk drive unit. Accordingly, no limitation on the invention is intended by way of the foregoing description and accompanying drawings, except as set forth in the appended claims.

What is claimed is:

1. A disk drive assembly station, comprising:
   a station platform;
   a head fixture on said platform and including means for a removably supporting a head actuator subassembly of a disk drive unit;
   a disk fixture including means for removably supporting a disk subassembly of a disk drive unit; and
   means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position;
   said means for supporting an actuator subassembly on said head fixture including means for removable connection to the actuator subassembly.

2. The disk drive assembly station of claim 1 wherein said means for supporting an actuator subassembly on said head fixture comprises a reference surface defined by said head fixture, and means for securing the actuator subassembly in seated relation upon said reference surface.

3. The disk drive assembly station of claim 2 wherein said securing means comprises means for drawing a portion of the actuator subassembly into seated relation upon said reference surface.

4. The disk drive assembly station of claim 2 further including means for adjustably positioning said reference surface relative to said platform.

5. The disk drive assembly station of claim 1 wherein said means for supporting a disk subassembly on said disk fixture includes means for removable connection to the disk subassembly.

6. The disk drive assembly station of claim 1 wherein said means for supporting a disk subassembly on said disk fixture comprises a reference surface defined by said disk fixture, and means for securing the disk subassembly in seated relation upon said reference surface.

7. The disk drive assembly station of claim 6 wherein said securing means comprises means for drawing a portion of the disk subassembly into seated relation upon said reference surface.

8. The disk drive assembly station of claim 6 further including means for adjustably positioning said reference surface relative to said platform.

9. The disk drive assembly station of claim 1 wherein said means for removably supporting said disk fixture comprises track means interacting between said disk fixture and said platform for guiding said disk fixture between said first and second positions.

10. The disk drive assembly station of claim 9 wherein said track means includes at least one rail, and linear bearing means supporting said disk fixture for guided movement along said rail.

11. The disk drive assembly station of claim 9 further including means for locking said disk fixture in said second position.

12. The disk drive assembly station of claim 9 further including means for locking said disk fixture in said first and second positions.

13. A disk drive assembly station, comprising:
    a station platform;
    a head fixture on said platform and including means for removably supporting a head actuator subassembly of a disk drive unit;
    a disk fixture including means for removably supportng a disk subassembly of a disk drive unit; and
    means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position;
    said head and disk fixtures respectively including a pair of reference surfaces disposed in predetermined precision spaced relation when said disk fixture is in said second position, said means for supporting the actuator and disk subassemblies respectively including means for seating the actuator and disk subassemblies on said reference surfaces.

14. A disk drive assembly station, comprising:
    a station platform;
    a head fixture on said platform and including means for removably supporting a head actuator subassembly of a disk drive unit;
    a disk fixture including means for removably supporting a disk subassembly of a disk drive unit;
    means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position; and
    further including a transfer tool for supporting the disk subassembly during transfer thereof to said disk fixture.

15. The disk drive assembly station of claim 14 further including a tool support stand on said platform for removably supporting said transfer tool in a position supporting the disk subassembly generally on said disk fixture when said disk fixture is in said second position.

16. A disk drive assembly station, comprising:
    a station platform;
    a head fixture on said platform and including means for removably supporting a head actuator subassembly of a disk drive unit;
    a disk fixture including means for removably supporting a disk subassembly of a disk drive unit; and
    means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position;

said head fixture further including means for supporting a magnet unit of a disk drive unit.

17. A disk drive assembly station, comprising:
a station platform;
a head fixture on said platform and including means for removably supporting a head actuator subassembly of a disk drive unit;
a disk fixture including means for removably supporting a disk subassembly of a disk drive unit; and
means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position;
said head fixture further including means for supporting a solenoid unit of a disk drive unit.

18. A disk drive assembly station, comprising:
a station platform;
a head fixture on said platform and including means for removably supporting a head actuator subassembly of a disk drive unit;
a disk fixture including means for removably supporting a disk subassembly of a disk drive unit;
means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position; and
further including a loading comb mounted on said platform and having a plurality of teeth adapted for movement between a first position retracted from said head fixture and a second position with said comb teeth engaging an actuator subassembly on said head fixture to maintain read/write heads of the actuator subassembly in spaced relation.

19. A disk drive assembly station, comprising:
a station platform;
a head fixture on said platform and including means for removably supporting a head actuator subassembly of a disk drive unit;
a disk drive including means for removably supporting a disk subassembly of a disk drive unit;
means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position; and
further including guide means projecting upwardly from said platform for guiding a housing base of a disk drive unit into seated relation with a disk subassembly on said disk fixture and an actuator subassembly on said head fixture.

20. The disk drive assembly station of claim 19 further including means for removably retaining the housing base seated respectively upon the disk and actuator subassemblies.

21. The disk drive assembly station of claim 19 wherein said guide means projects a substantial distance above a disk subassembly and an actuator subassembly supported respectively on said disk and head fixtures.

22. The disk drive assembly station of claim 21 wherein said guide means comprises at least two cover pins projecting upwardly from said platform for reception through guide ports formed in the housing base.

23. The disk drive assembly station of claim 22 further including means for movably supporting at least one of said cover pins for movement relative to said platform.

24. A disk drive assembly station, comprising:
a station platform;
a head fixture on said platform and including means for removably supporting a head actuator subassembly of a disk drive unit;
a disk fixture including means for removably supporting a disk subassembly of a disk drive unit;
means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position; and
further including means for supporting said platform for movement between upright and inverted orientations, said platform having at least one opening formed therein to expose at least a portion of an actuator subassembly supported on said head fixture when said platform is in said inverted orientation.

25. The disk drive assembly station of claim 24 further including means for releasably locking said platform in said upright and inverted positions.

26. A disk drive assembly station, comprising:
a station platform;
a head fixture on said platform and including means for removably supporting a head actuator subassembly of a disk drive unit;
a disk fixture including means for removably supporting a disk subassembly of a disk drive unit; and
means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position;
said means for supporting the actuator subassembly comprising a torque spindle having a threaded tip for threadably engaging the actuator subassembly with a predetermined torque load limit.

27. The disk drive assembly station of claim 26 wherein said torque spindle includes a head disposed below said platform.

28. A disk drive assembly station comprising:
a station platform;

a head fixture on said platform and including means for removably supporting a head actuator subassembly of a disk drive unit;

a disk fixture including means for removably supporting a disk subassembly of a disk drive unit; and means for movably supporting said disk fixture on said platform for movement between a first position spaced substantially from said head fixture and a second position in predetermined precision spaced relation with said head fixture, whereby a disk subassembly supported on said disk fixture is movable into precision registration with an actuator subassembly supported on said head fixture when said disk fixture is in said second position;

said means for supporting the disk subassembly comprising a torque spindle having a threaded tip for threadably engaging the disk subassembly with a predetermined torque load limit.

29. The disk drive assembly station of claim 28 wherein said torque spindle includes a head disposed below said platform.

30. A disk drive assembly station, comprising:

a head fixture including means for removably supporting a head actuator subassembly of a disk drive unit;

a disk fixture including means for removably supporting a disk subassembly of a disk drive unit;

means for movably supporting one of said head and disk fixtures for displacement between first and second positions relative to the other of said head and disk fixtures, said head and disk fixtures being oriented to support the actuator and disk subassemblies in precision registration when said one fixture is in said second position;

said head and disk fixtures being mounted on a common platform; and further including guide means projecting upwardly from said platform for guiding a housing base of a disk drive unit into seated relation with a disk subassembly on said disk fixture and an actuator subassembly on said head fixture.

31. THe disk drive assembly station of claim 30 wherein said head and disk fixtures respectively include reference surfaces disposed in predetermined spatial relation when said one fixture is in said second position.

32. The disk drive assembly station of claim 30 wherein said one fixture comprises said disk fixture, and further including means for locking said disk fixture in said second position.

33. A disk drive assembly station for precision assembly of a head actuator subassembly and a disk subassembly of a disk drive unit into a housing base for the disk drive unit, said station comprising:

a platform;

a head fixture on said platform and defining a first reference surface for removable seated support of the actuator subassembly said head fixture including means for drawing a portion of the actuator subassembly into seated relation with said first reference surface;

a disk fixture defining a second reference surface for removable seated support of the disk subassembly, said disk fixture including means for drawing a portion of the disk subassembly into seated relation with said second reference surface; and track means on said platform for movably supporting said disk fixture relative to said platform, said disk fixture being movable between a first position spaced substantially from said head fixture for facilitated reception of the disk subassembly, and a second position supporting the disk subassembly in substantially precision registration with the actuator subassembly;

said actuator subassembly including a threaded bore at one end thereof, said head fixture including a support sleeve, means for mounting said support sleeve relative to said platform such that one end of said support sleeve defines said first reference surface, and a torque spindle rotatably received within said support sleeve and including a threaded tip for threaded engagement into said threaded bore to draw said one end of the actuator subassembly into seated relation with said first reference surface.

34. The disk drive assembly station of claim 33 wherein said torque spindle includes means for preventing advancement of said threaded tip into said threaded bore when a predetermined torque load limit is reached.

35. The disk drive assembly station of claim 33 further including a spring loaded alignment pin carried by said platform for reception into a port formed in the actuator subassembly.

36. The disk drive assembly station of claim 33 wherein said track means comprises a substantially linear track and bearing means cooperating between said platform and said disk fixture for guiding said disk fixture between said first and second positions.

37. The disk drive assembly station of claim 33 further including means for locking said disk fixture respectively in said first and second positions.

38. A disk drive assembly station for precision assembly of a head actuator subassembly and a disk subassembly of a disk drive unit into a housing base for the disk drive unit, said station comprising:

a platform;

a head fixture on said platform and defining a first reference surface for seated support of the actuator subassembly, said head fixture including means for drawing a portion of the actuator subassembly into seated relation with said first reference surface;

a disk fixture defining a second reference surface for seated support for the disk subassembly, said disk fixture including means for drawing a portion of the disk subassembly into seated relation with said second reference surface; and track means on said platform for movably supporting said disk fixture relative to said platform, said disk fixture being movable between a first position spaced substantially from said head fixture for facilitated reception of the disk subassembly, and a second position supporting the disk subassembly in substantially precision registration with the actuator subassembly;

said disk subassembly including a threaded bore at one end thereof, said disk fixture including a support sleeve, means for mounting said support sleeve relative to said platform such that one end of said support sleeve defines said second reference surface, and a torque spindle rotatably received within said support sleeve and including a threaded tip for threaded engagement into said threaded bore to draw said one end of the disk subassembly into seated relation with said second reference surface.

39. The disk drive assembly station of claim 38 wherein said torque spindle includes means for preventing advancement of said threaded tip into said threaded bore when a predetermined torque load limit is reached.

40. A disk drive assembly station for precision assembly of a head actuator subassembly and a disk subassembly of a disk drive unit into a housing base for the disk drive unit, said station comprising:

platform;

a head fixture on said platform and defining a first reference surface for seated support of the actuator subassembly, said head fixture including means for drawing a portion of the actuator subassembly into seated relation with said first reference surface;

a disk fixture defining a second reference surface for seated support for the disk subassembly, said disk fixture including means for drawing a portion of the disk subassembly into seated relation with said second reference surface; and track means on said platform for movably supporting said disk fixture relative to said platform, said disk fixture being movable between a first position spaced substantially from said head fixture for facilitated reception of the disk subassembly, and a second position supporting the disk subassembly in substantially precision registration with actuator subassembly;

further including a loading comb mounted on said platform and having a plurality of teeth adapted for movement between a first position retracted from said head fixture and a second position with said comb teeth engaging the actuator subassembly on said head fixture to maintain read/write heads of the actuator subassembly in spaced relation.

41. A disk drive assembly station for precision assembly of a head actuator subassembly and a disk subassembly of a disk drive unit into a housing base for the disk drive unit, said station comprising:

a platform;

a head fixture on said platform and defining a first reference surface for seated support of the actuator subassembly, said head fixture including means for drawing a portion of the actuator subassembly into seated relation with said first reference surface;

a disk fixture defining a second reference surface for seated support for the disk subassembly, said disk fixture including means for drawing a portion of the disk subassembly into seated relation with said second reference surface;

track means on said platform for movably supporting said disk fixture relative to said platform, said disk fixture being movable between a first position spaced substantially from said head fixture for facilitated reception of the disk subassembly, and a second position supporting the disk subassembly in substantially precision registration with the actuator subassembly; and further including guide means projecting upwardly from said platform for guiding the housing base of a disk drive unit into seated relation with the disk subassembly on said disk fixture and the actuator subassembly on said head fixture.

42. The disk drive assembly station of claim 41 wherein said guide means comprises at least two cover pins projecting upwardly from said platform for reception through guide ports formed in the housing base.

43. The disk drive assembly station of claim 42 further including means for movably supporting at least one of said cover pins for movement relative to said platform.

44. A disk drive assembly station for precision assembly of a head actuator subassembly and a disk subassembly of a disk drive unit into a housing base for the disk drive unit, said station comprising:

platform;

a head fixture on said platform and defining a first reference surface for seated support of the actuator subassembly, said head fixture including means for drawing a portion of the actuator subassembly into seated relation with said first reference surface;

a disk fixture defining a second reference surface for seated support for the disk subassembly, said disk fixture including means for drawing a portion of the disk subassembly into seated relation with said second reference surface;

track means on said platform for movably supporting said disk fixture relative to said platform, said disk fixture being movable between a first position spaced substantially from said head fixture for facilitated reception of the disk subassembly, and a second position supporting the disk subassembly in substantially precision registration with the actuator subassembly; and further including means for supporting said platform for movement between upright and inverted orientations, said platform having at least one opening formed therein to expose at least a portion of an actuator subassembly supported on said head fixture when said platform is in said inverted orientation.

* * * * *